United States Patent Office 3,065,561
Patented Nov. 27, 1962

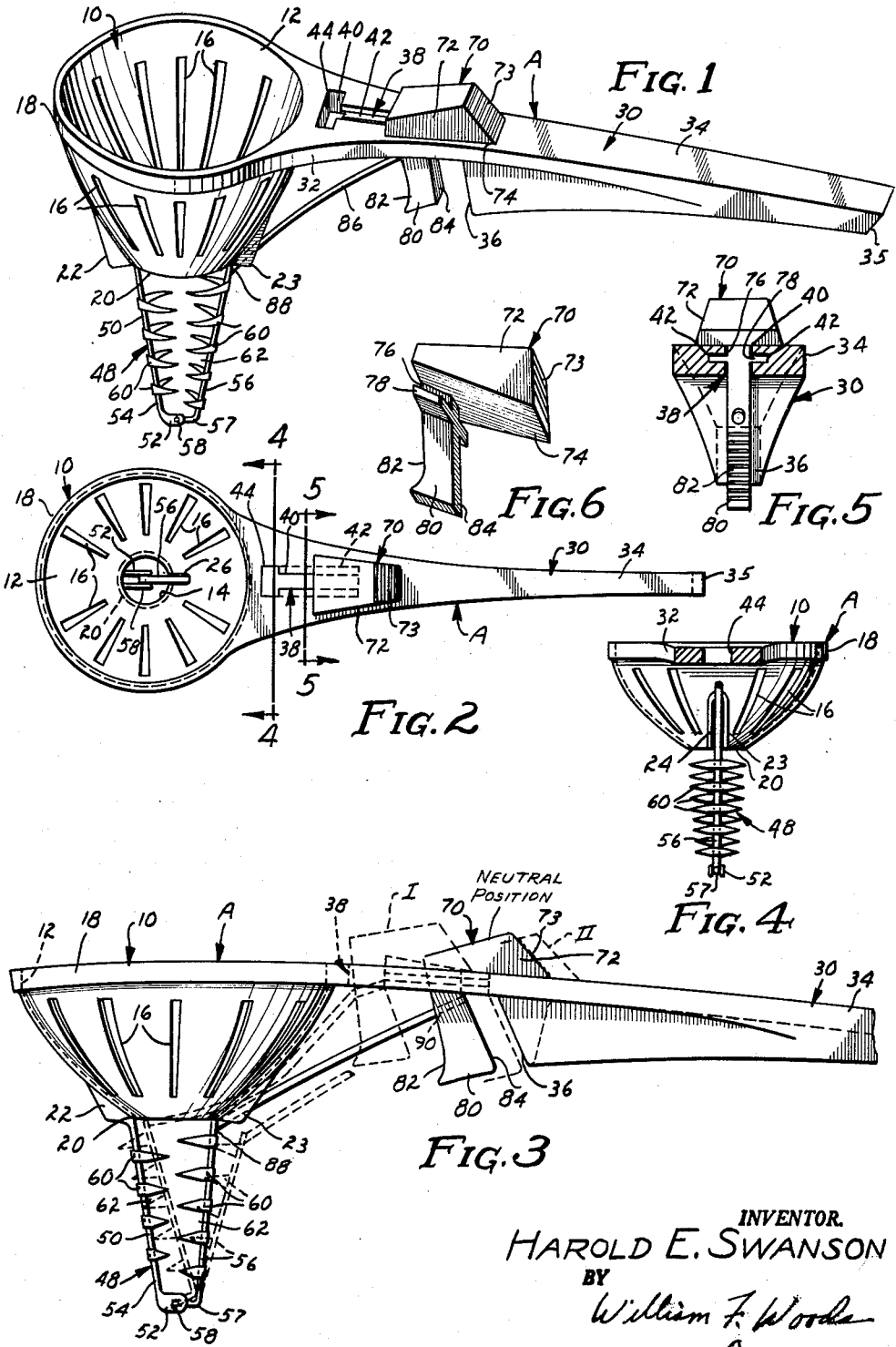

3,065,561
MINNOW DIPPER AND HOLDER
Harold E. Swanson, Waverly, Minn.
Filed Jan. 2, 1962, Ser. No. 163,510
6 Claims. (Cl. 43—4)

This invention relates to a live bait handling device and more particularly concerns modifications and changes made in the structure described and claimed in my co-pending application Serial Number 141,213, entitled "Minnow Dipper and Holder," filed September 27, 1961. This application is a continuation-in-part of the application referred to.

Prior art devices for handling and transferring minnows from a minnow bucket to a fish hook have taken many forms. Some of these use means in their handles for handling and transferring the minnows. Others employ conical bodies that discharge the captured minnow from the lower end thereof. The limitations of these devices include difficulty in positively manipulating the minnow from a swimming position to an impaled position on a hook and their inability to complete the operation without changing hands. These and other reasons have prompted the invention disclosed and claimed in the above mentioned parent application. The instant application in its broader aspects concerns the same general concept involved in the earlier filed application, viz., the idea of a handle equipped conical body having a longitudinally split cage suspended below the diminished lower end thereof adapted for one hand operation to receive, hold and release a minnow trapped in the device and funnelled into the cage.

Accordingly, this application has for a primary purpose the providing of structure somewhat simpler in design and operation from the structure disclosed in the parent application and more readily adapted for manufacture from synthetic materials.

Another object of this invention is to provide in a minnow dipper and holder of the type having a longitudinally split cage for receiving, holding and releasing minnows, novel means for manipulating said cage into a selected position.

A further object of this invention is to provide in a minnow dipper and holder of the type described novel means for releasably locking the cage in a selected position.

Yet another object of this invention is to provide in a minnow dipper and holder of the type having a split cage in communication with a conical body, novel means for limiting the movement of the movable section of the cage.

Another object of this invention is to provide a new and improved minnow dipper and holder that can be manufactured out of readily available materials with a minimum of cost, is extremely rugged in design and durable in operation, and is made of a minimum of components.

A further object of this invention is to provide a minnow dipper and holder of the type described that can be made entirely of synthetic materials.

These and other objects and advantages of the invention will become more fully apparent from a consideration of the following detailed description and accompanying drawing wherein an embodiment of the invention is shown by way of illustration only.

In the drawing:
FIGURE 1 is a perspective view of the invention;
FIGURE 2 is a top plan view of the invention;
FIGURE 3 is a side elevational view of the invention, with the operating elements thereof being shown in three positions, the dotted lines indicating the closed and open positions of the cage forming part of the invention;
FIGURE 4 is a view, partially in section, taken on the line 4—4 of FIGURE 2;
FIGURE 5 is a view, partially in section, taken on the line 5—5 of FIGURE 2; and
FIGURE 6 is a perspective view of the operating button forming part of the invention.

Referring now to the drawing, FIGURE 1 illustrates the invention A in its entirety. A generally inverted cup-shaped body 10 having an enlarged upper opening 12 and a diminished lower opening 14 characterizes the construction of the minnow trapping part of the device. A series of spaced generally vertical slots 16 extend between the top and bottom of body 10 to permit the flow of water therethrough. As shown in FIGURES 1 to 3, inclusive, body 10 terminates at its upper extremity in a generally circular rim 18 and at the bottom thereof in a circular rim 20 of lesser diameter.

A pair of opposed lugs 22, 23 are formed integral with the lower portion of body 10 to lend rigidity thereto; the rearward lug 23 being equipped with an internal guide slot 24 that is in vertical register with a slot 26 in body 10 radially communicating with opening 14 therein. As shown in FIGURE 2, slot 26 in body 10 is in horizontal register with the center line of handle 30 which is formed integral with body 10 and extends therefrom.

Handle 30 includes a pair of symmetrical shoulder 32 extending from rim 18 of body 10 that terminate in a generally elongated hand engageable shank 34. A forwardly facing generally vertical lower buttress 36 extends from a point intermediate the end 35 of handle 30 and body 10 rearwardly therefrom to blend into the rear section of handle 30 as shown in FIGURES 1 and 3. Handle 30 further includes an elongated slot or aperture 38 formed centrally therein. Aperture 38 is formed with a central opening 40 that extends through handle 30. As shown in FIGURE 5, a narrow recess 42 extends on each side of opening 40 between the upper and lower surfaces of handle 30. Recesses 42 terminate at their forward end in a rather narrow transverse shelf 44 that is open upwardly in communication with the upper surface of handle 30.

Connected to the bottom of body 10 is an elongated longitudinally split cage designated generally by reference character 48. Cage 48 includes an elongated relatively thin forward depending support member 50 molded integral with forward lug 22 of body 10. A pair of generally horizontal hinge members 52 are carried at the lower free end 54 of support member 50. Further provided is a mating pivotal support member 56 having a lower horizontal leg 57 that is hingedly attached to hinge members 52 by virtue of a pin connection 58. Both support member 50 and support member 56 are equipped with a series of longitudinally spaced generally semi-circular segments 60. As shown in FIGURE 3, the segments 60 of pivotal support 56 are staggered vertically with respect to the segments 60 of fixed support 50 so that upon the pivotal movement of support 56 towards support 50 an interlocking or meshing of segments 60 will result to allow maximum movement of support 56 in the direction of support 50. The resulting arrangement is an elongated minnow cage construction having openings 62 along the sides thereof to permit the insertion of a hook therethrough, as will be explained.

Further provided is a one piece operating button generally designated by reference character 70. Button 70 is characterized by an enlarged upper body 72 formed with a lower surface 74 adapted to overly aperture 38 in handle 30 in sliding engagement with the top surface thereof. The rear surface of body 72 is slanted and equipped with non-slip ridges 73. Integral with body 72 of button 70 is an intermediate shank portion 76 which, from the forward end thereof, extends transversely thereto a pair of aligned opposed shoulders 78 adapted to slidably fit into recesses 42 of opening 40. Carried at the forward end of shank 76 in a depending manner is a finger latch 80 which extends through opening 40 in handle 30, as shown in FIGURE 1. The forward end of latch 80 is slightly curved, as at 82, while the rear surface thereof is generally straight, as at 84, to provide abutting engagement thereof with buttress 36 of handle 30 when button 70 is moved rearwardly towards the end 35 of handle 30.

Connection between operating button 70 and the pivotal section of cage 48 is accomplished by a slender resilient connector 86. Connector 86 is fastened at one end thereof to the upper free end of pivotal support 56 as at 88, and at the other end thereof to latch 80 just below its extension through opening 40 in handle 30, as at 90. Connector 86 is preferably made of plastic coated wire having sufficient rigidity to resist looping and sufficient resiliency to withstand the flexing imposed upon it during the operation of the device, as will be explained.

In the use of the device, handle 30 is grasped by the hand and button 70 is placed by combined finger and thumb action, so that cage 48 is in a neutral or minnow receiving position. This position is indicated in FIGURE 3 by the solid line characterization of button 70, connector 86 and cage 48. A minnow is trapped in body 10 and allowed to pass through lower opening 14 into cage 48. For hooking the minnow, button 70 is pushed forward with the thumb to pivot cage 48 into a minnow clamping position, indicated by the dotted lines referenced by Roman numeral I. A hook is then inserted into the clamped minnow through openings 62 in the body of cage 48. To release the hooked minnow, button 70 is slid back by finger latch 80 toward the end 35 of handle 30 whereby to place cage 48 into an open position, indicated generally by the dotted lines marked by Roman numeral II in FIGURE 3.

The ledge provided by transverse shelf 44 in opening 40 of handle 30 allows button 70 to be locked in place during the minnow clamping operation as shoulders 78 of button 70 are slightly wedged between recesses 42 when button 70 is advanced to its extreme forward position. As shown, button 70 is tipped slightly backward by this action. When connector 86 is caused to move forward to a minnow clamping position it is guided by the walls of slot 24 in lug 23 which also serve to frictionally retard the movement of the components to insure positive action during the operation of the device. Slot 26 in body 10 allows the passage therethrough of part of connector 86 during its forward movement so that the flexing thereof will be substantially uniform throughout its length.

When button 70 is withdrawn to its extreme rearward position, its straight rear surface 84 abuttingly engages buttress 36 of handle 30 to stop the rearward travel of the assembly. The resulting open position of cage 48 allows the easy removal therefrom of the hooked minnow.

Any suitable material may be used in the construction of the device, although it has been found that synthetic materials, especially thermoplastic materials, are the most economical and are entirely satisfactory. With the exception of connector 86, the entire unit can be molded of suitable plastic materials and assembled in the manner shown.

The invention has been tested and found to be entirely satisfactory for the use intended. It can be used for both winter and summer fishing and is not affected by temperature extremes or other environmental conditions. Thus there has been shown and described a novel modification of the device set forth in the earlier filed application designated hereinabove by serial number, filing date and title. Although substitutions and equivalents may be used to modify the teaching of this invention I intend to be limited solely by the scope of the appended claims.

I claim:

1. In a minnow dipper and holder, an inverted hollow generally conical body, a hollow truncated elongated longitudinally split cage connected to and in communication with the lower end of said body, said cage being generally open at the ends thereof and having an opening therein through which a fishhook may be inserted to hook a minnow placed in said cage, said cage including a pivotal section movable from a normal minnow receiving position into minnow clamping and minnow releasing positions, handle means secured to the upper end of said body, said handle means having an aperture therein, an operating button slidably mounted on said handle means and having a portion thereof extending through the aperture of said handle means and flexible connector means engageable with said pivotal section and with the portion of said operating button extending through said handle means for manipulating said pivotal section into a selected position.

2. The device of claim 1 wherein means associated with said handle means and said operating button are provided to releasably lock said pivotal section into a minnow clamping position.

3. A minnow dipper and holder including a hollow inverted generally cone-shaped body having an open upper end and an open lower end, said body being adapted to pass water through the wall thereof, a minnow receiving cage connected to and in communication with the lower open end of said body, said cage being generally open at its ends and having an opening through which a fishhook may be inserted to hook a minnow placed in said cage, said cage being split lengthwise and including a fixed section and a pivotally movable section, said movable section being hinged to the lower end of said fixed section, an elongated handle carried by the upper end of said body, said handle having a longitudinal aperture therein, an operating button slidably mounted upon said handle and having a portion thereof extending through the aperture of said handle, a flexible connector attached at one end thereof to the pivotal section of said cage and at the other end thereof to the portion of said operating button extending through said handle, said button and said connector being movable rearwardly to bring the pivotal section of said cage from a minnow clamping position to minnow receiving and minnow releasing positions, means for locking said operating button in a minnow clamping position, and means for limiting the rearward movement of said operating button when said cage is placed in a minnow releasing position.

4. The device of claim 3 wherein the longitudinal aperture in said handle is characterized by recessed means intermediate the top and bottom surface of said handle and forward shelf means in open communication with the top surface of said handle, said operating button being equipped with opposed shoulders slidably engageable with the recessed means of said handle and operable to bias said operating button into a forward locking position when the said shoulders are in contact with the shelf means and the recessed means of said handle, said operating button further including a lower finger latch extending through the aperture of said handle, and said handle having a lower buttress engageable with said finger latch to restrict the rearward movement of said operating button and said connector.

5. In a minnow dipper and holder, a generally cup-shaped body having an enlarged open top and diminished open bottom, a hollow elongated generally cylindrical cage connected to and in communication with the diminished open bottom of said body, said cage having open ends and including a fixed section and a movable section, each of said sections being generally semi-circular in cross section and having openings therein through which a fishhook may be inserted to hook a minnow placed in said cage, said movable section being pivoted to said fixed section at the lower end thereof, a handle secured to and integral with said body, said handle having a central elongated aperture therein, said handle further having recessed means in communication with the aperture therein and shelf means in communication with the recessed means and with the upper surface of said handle, thumb and finger engageable operating means slidably mounted on said handle, said operating means including a thumb upper body slidably engageable with the upper surface of said handle in overlying relation to the aperture therein and having an intermediate shank portion extending through the aperture of said handle, said operating means having a finger latch integral with said shank portion extending below said handle, said operating means further including shoulder means between said shank portion and said upper body thereof engageable with the recessed and shelf means of said handle operable to releasably lock said operating means into a selected position, and connector means between said operating means and said pivotal section of said cage operable to move said pivotal section into minnow clamping, minnow holding and minnow receiving positions upon manipulation of said operating means.

6. The device of claim 5 wherein said cup-shaped body is slotted so as to be adapted to pass water therethrough.

References Cited in the file of this patent

UNITED STATES PATENTS

| | | |
|---|---|---|
| 2,502,816 | Bennek | Apr. 4, 1950 |
| 2,531,551 | Brecht et al. | Nov. 28, 1950 |
| 2,982,045 | Highland | May 2, 1961 |